United States Patent [19]

Hibi et al.

[11] Patent Number: 5,099,719
[45] Date of Patent: Mar. 31, 1992

[54] CONTROL SYSTEM FOR CONTINUOUSLY VARIABLE TRANSMISSION

[75] Inventors: Toshifumi Hibi, Yokohama; Masaki Nakano, Kawasaki, both of Japan

[73] Assignee: Nissan Motor Co., Ltd., Yokohama, Japan

[21] Appl. No.: 505,272

[22] Filed: Apr. 6, 1990

[30] Foreign Application Priority Data

Apr. 21, 1989 [JP] Japan .................................. 1-100212

[51] Int. Cl.$^5$ ............................................. B60K 41/18
[52] U.S. Cl. .................... 74/866; 364/424.1; 74/867
[58] Field of Search ................. 74/866, 867; 474/12, 474/18, 28; 364/424.1

[56] References Cited

U.S. PATENT DOCUMENTS

| | | | |
|---|---|---|---|
| 4,387,608 | 6/1983 | Mohl et al. | 74/866 |
| 4,458,560 | 7/1984 | Frank et al. | 74/866 X |
| 4,458,561 | 7/1984 | Frank | 74/865 |
| 4,462,275 | 7/1984 | Mohl et al. | 74/866 |
| 4,515,041 | 5/1985 | Frank et al. | 74/866 |
| 4,576,265 | 3/1986 | Kumura et al. | 192/0.055 |
| 4,579,021 | 4/1986 | Yamamuro et al. | 74/869 |
| 4,580,465 | 4/1986 | Omitsu | 74/866 |
| 4,589,858 | 5/1986 | Gaddi | 474/12 |
| 4,597,308 | 7/1986 | Tanaka et al. | 74/866 |
| 4,649,487 | 3/1987 | Osanai et al. | 474/12 X |
| 4,653,004 | 3/1987 | Osanai et al. | 364/424.1 |
| 4,653,005 | 3/1987 | Osanai et al. | 364/424.1 |
| 4,670,843 | 6/1987 | Matsumura et al. | 364/424.1 |
| 4,673,378 | 6/1987 | Tokoro et al. | 474/18 |
| 4,702,128 | 10/1987 | Oshiage | 74/866 |
| 4,708,031 | 11/1987 | Morimoto et al. | 74/866 |
| 4,718,012 | 1/1988 | Oshiage | 364/424.1 |
| 4,720,793 | 1/1988 | Watanabe et al. | 364/424.1 |
| 4,729,103 | 3/1988 | Oshiage et al. | 364/424.1 |
| 4,735,113 | 4/1988 | Yamamuro et al. | 74/866 |
| 4,743,223 | 5/1988 | Tokoro et al. | 474/69 |
| 4,772,249 | 9/1988 | Kouno et al. | 474/28 |
| 4,794,819 | 1/1989 | Tanaka et al. | 74/866 |
| 4,819,513 | 4/1989 | Morimoto | 74/866 |
| 4,827,803 | 5/1989 | Miyawaki | 74/866 |
| 4,846,019 | 7/1989 | Kumura | 74/866 X |
| 4,853,858 | 8/1989 | Kumura | 364/424.1 |
| 4,862,771 | 9/1989 | Kumura et al. | 74/866 |
| 4,923,433 | 5/1990 | Tanaka et al. | 474/28 X |
| 4,942,783 | 7/1990 | Morimoto | 74/866 |

FOREIGN PATENT DOCUMENTS

| | | |
|---|---|---|
| 0096758 | 12/1983 | European Pat. Off. . |
| 0258005 | 3/1988 | European Pat. Off. . |
| 61-105349 | 5/1986 | Japan . |
| 61-105353 | 5/1986 | Japan . |
| 62-75170 | 4/1987 | Japan . |
| 62-100334 | 6/1987 | Japan . |
| 62-127555 | 6/1987 | Japan . |
| 63-43837 | 2/1988 | Japan . |
| 63-84451 | 6/1988 | Japan . |
| 63-130953 | 6/1988 | Japan . |
| 2058257 | 4/1981 | United Kingdom . |
| 2146395 | 4/1985 | United Kingdom . |

Primary Examiner—Leslie A. Braun
Assistant Examiner—Matthew Stavish
Attorney, Agent, or Firm—Foley & Lardner

[57] ABSTRACT

A system for controlling a continuously variable transmission is disclosed, in which a shift actuator is controlled in a feed-back manner with a feed-back gain such that a deviation between target and current values related to a reduction ratio reduces toward zero, and the feed-back gain is altered in response to a current torque detected.

4 Claims, 10 Drawing Sheets

CONTROL SYSTEM FOR CONTINUOUSLY VARIABLE TRANSMISSION

BACKGROUND OF THE INVENTION

The present invention relates to a control system for a continuously variable transmission.

JP-A No. 63-43837 discloses a conventional control system for a continuously variable transmission. This control system is constructed and arranged so that a target reduction ratio is achieved by a feed-back control of a shift actuator. When a motor vehicle is not driven, viz., an engine brake is applied, a feed-back gain becomes larger. This ameliorates the followability and the responsibility of shifting to the maximum reduction ratio. Thus, even if quick deceleration takes place, shifting up to the maximum gear ratio can be achieved before the motor vehicle comes to a standstill.

A problem encountered in such a conventional control system for a continuously variable transmission is that, since the feed-back gain is kept constant regardless of change in an input torque to the transmission, viz., an engine torque, time is needed to bring a current reduction ratio to the target reduction ratio when the engine torque is large, and it is difficult to keep the target reduction ratio corresponding to the current reduction ratio even during normal operation of the motor vehicle. Specifically, with a continuously variable V-belt transmission, the reduction ratio is determined by a balance between a hydraulic pressure on a movable conical member of a pulley and a tension of a V-belt. If the engine torque increases out of a predetermined balanced reduction ratio, for example, the tension of the V-belt also increases. In this event, the hydraulic pressure on the pulley increases in a delayed manner, the reduction ratio is deviated to the maximum reduction ratio. Further, with a continuously variable traction roller transmission which is disclosed, for example, in JP-U No. 63-84451, shifting takes place in a controlling position of roller support members by the hydraulic pressure. Thus, when the engine torque increases, the hydraulic pressure within a hydraulic servo apparatus for position control of the roller support members changes in a delayed manner, resulting in an occurrence of a deviation between the current reduction ratio and the target reduction ratio. Even during normal operation of the motor vehicle, the hydraulic pressure for holding the roller support members has to increase as the engine torque becomes larger. In this event, the hydraulic servo apparatus may not be held in a predetermined position due to increased leakage from seal portions, resulting in the occurrence of a deviation of the current reduction ratio to the maximum reduction ratio.

SUMMARY OF THE INVENTION

An object of the present invention is to provide a control system for a continuously variable transmission wherein quick responsibility and high followability of shifting can be achieved.

According to one aspect of the present invention, there is provided a system for controlling a continuously variable transmission such that the continuously variable transmission is adjusted to a reduction ratio that is determined in response to a position which a shift actuator is positioned at, the system comprising:

means for determining a target value of a predetermined variable related to a reduction ratio which the continuously variable transmission should be adjusted to and generating a target value indicative signal indicative of said target value determined;

means for detecting a current value of said predetermined variable and generating a current value indicative signal indicative of said current value detected;

means for detecting a current torque which the continuously variable transmission is subject to and generating a current torque indicative signal indicative of said current torque detected;

means for controlling the shift actuator in a feed-back control manner with a feed-back gain such that a deviation between said current value indicative signal and said target value indicative signal reduces toward zero; and means for altering said feed-back gain in response to said current torque indicative signal.

According to another aspect of the present invention, there is provided a method of controlling a continuously variable transmission such that the continuously variable transmission is adjusted to a reduction ratio that is determined in response to a position which a shift actuator is positioned at, the method comprising the step of:

determining a target value of a predetermined variable related to a reduction ratio which the continuously variable transmission should be adjusted to and generating a target value indicative signal indicative of said target value determined;

detecting a current value of said predetermined variable and generating a current value indicative signal indicative of said current value detected;

detecting a current torque which the continuously variable transmission is subject to and generating a current torque indicative signal indicative of said current torque detected;

controlling the shift actuator in a feed-back control manner with a feed-back gain such that a deviation between said current value indicative signal and said target value indicative signal reduces toward zero; and altering said feed-back gain in response to said current torque indicative signal.

DETAILED DESCRIPTION OF THE PREFERRED EMBODIMENTS OF THE INVENTION

Referring to the accompanying drawings, a preferred embodiment of a control system for a continuously variable transmission according to the present invention will be described.

Figure 1:
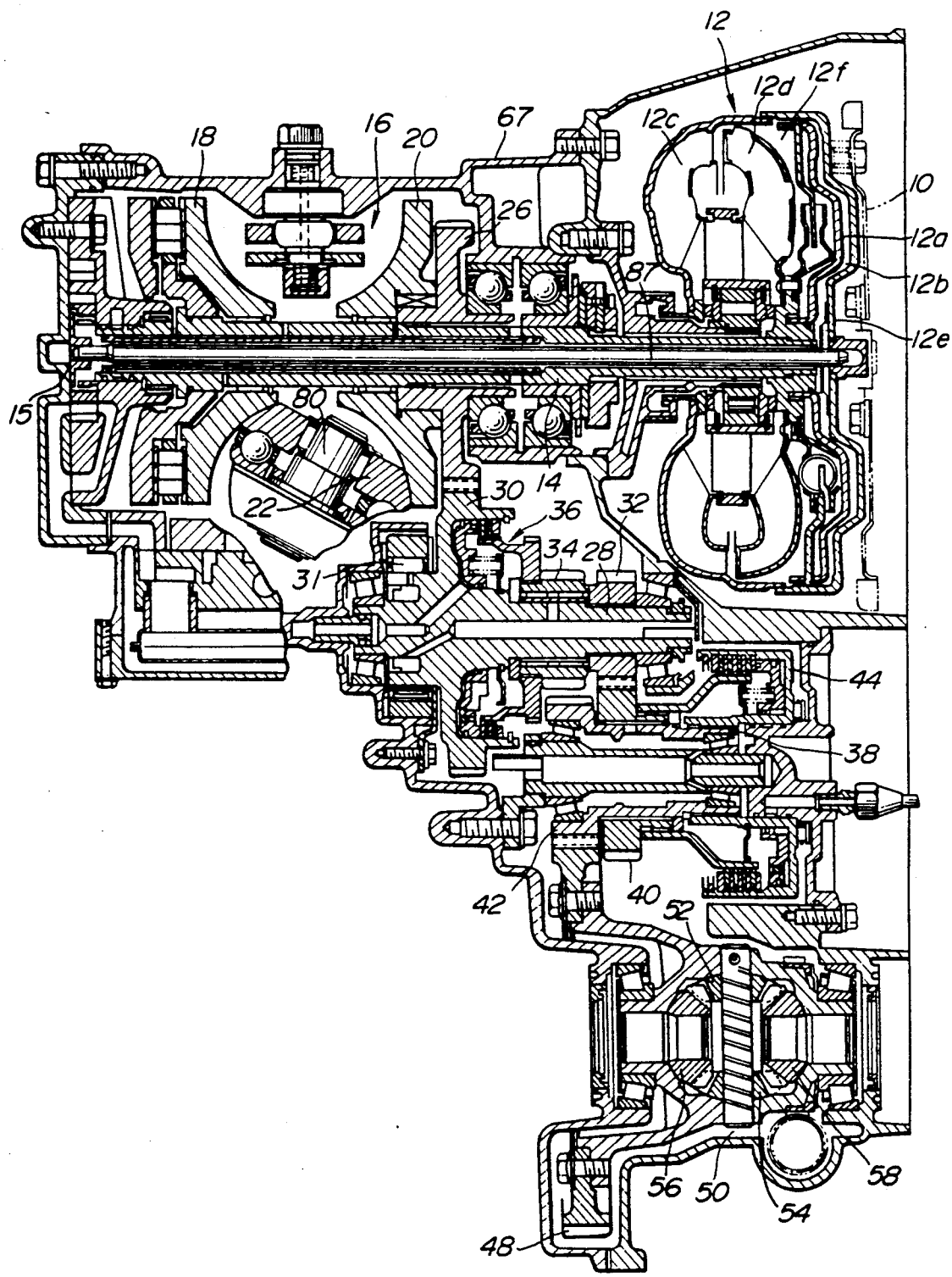
FIG. 1 is a sectional view illustrating a continuously variable traction roller transmission to which a preferred embodiment of the present invention is applied.

Referring first to FIG. 1, there is shown a continuously variable transmission. A torque converter 12 is connected to a drive plate 10 which is integrated with an output shaft of an engine. The torque converter 12 includes a lock-up clutch 12a which allows mechanical connection and disconnection of a pump impeller 12c on the input side with a turbine runner 12d on the output side by controlling a hydraulic pressure within a lock-up hydraulic chamber 12b. An oil pump drive shaft 87 is connected to a cover 12e of the torque converter 12, and it is also connected to an oil pump 15. The oil pump 15 and the torque converter 12 are arranged on the opposite sides of a continuously variable traction roller transmission unit 16. The turbine runner 12d of the torque converter 12 is connected to a hollow input shaft 14. Connected to the input shaft 14 is the continuously variable traction roller transmission unit 16 which includes an input traction disc 18, an output traction disc 20, and a traction roller 22 for transmitting torque from the input disc 18 to the output disc 20. The input and output traction discs 18, 20 have toroid surfaces which come in contact with the traction roller 22. An inclination of a shaft 80 of the traction roller 22 is adjustable by a mechanism which will be described hereinafter in connection with FIG. 3. The input traction disc 18 is coupled with the input shaft 14, whereas the output traction disc 20 is coupled with a gear 26 for unitary rotation. The gear 26 is in engagement with a gear 30 which is integrated with one idler shaft 28. Arranged to the idler shaft 28 are a gear 32 which is always rotatable therewith, and a gear 34 which is rotatably supported thereon. By means of a reverse clutch 36, the gear 34 is connectable with the gear 30 for unitary rotation. The idler shaft 28 is rotatable only in a forward direction, and thus not rotatable in a reverse direction by a one-way clutch 31 which is mounted to a casing 67. This prevents the continuously variable traction roller transmission unit 16 from being rotated in a direction contrary to that of the engine by an inverse driving force which is induced by road wheels. Another idler shaft 38 is arranged in parallel to the idler shaft 28A. A gear 40 is rotatably supported on the idler shaft 38, and a gear 42 is always connected thereto for unitary rotation. By a forward clutch 44, the gear 40 is connectable to the idler shaft 38 for unitary rotation. The gear 40 is in engagement with the gear 32, whereas the gear 42 is always in engagement with a final gear 48 to which a pair of pinion gears 52, 54 of a differential gear 50 are mounted. The pair of pinion gears 52, 54 are in engagement with a pair of side gears 56, 58, each being connected to the output shaft. With such structure, the output shaft rotates in the forward direction by meshing the forward clutch 44, whereas it rotates in the reverse direction by meshing the reverse clutch 36. In the continuously variable traction roller transmission unit 16, a reduction ratio is changeable continuously by controlling the condition under which the traction roller 22 contacts with the input traction disc 18 and the output traction disc 20.

Figure 2:
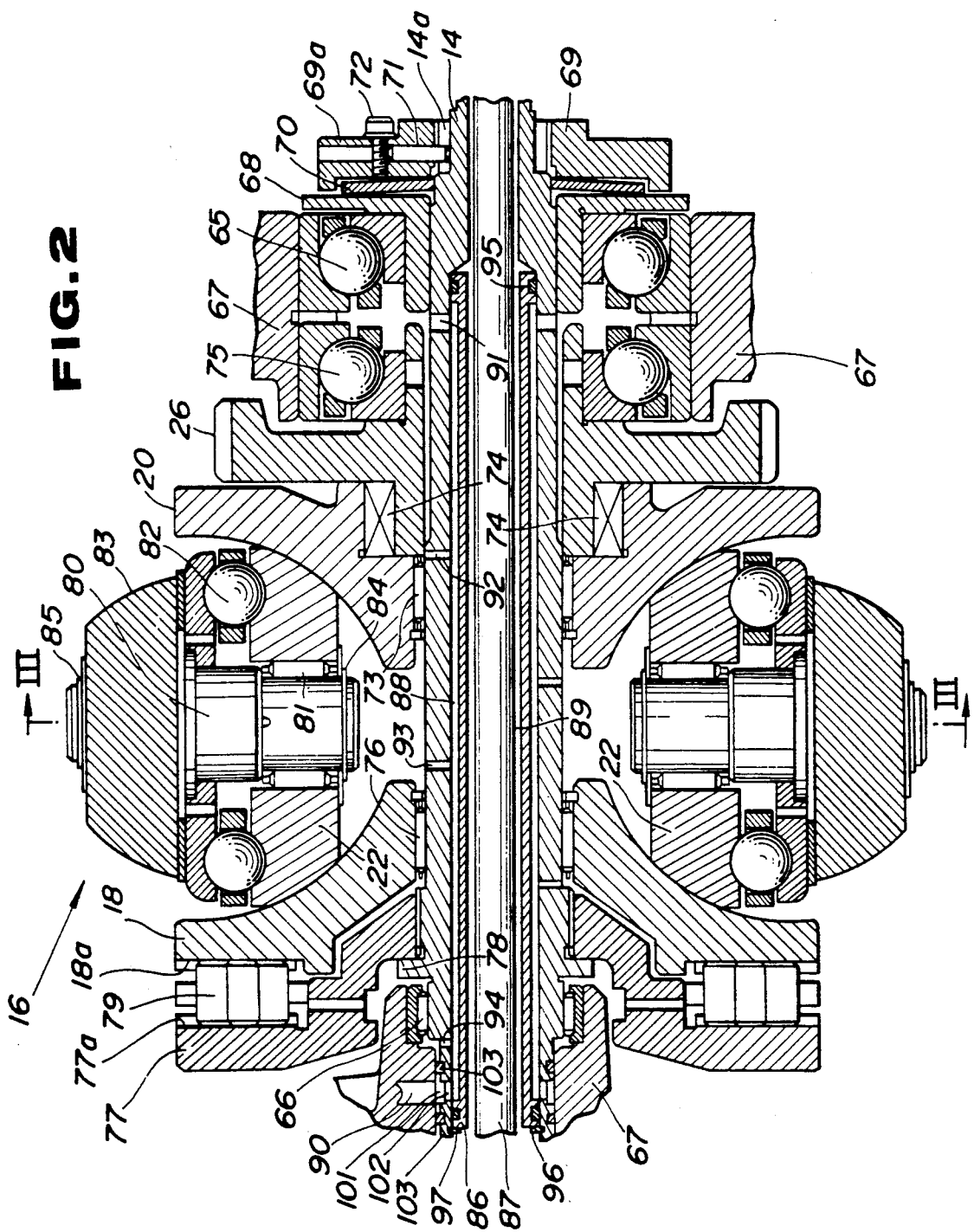
FIG. 2 is an enlarged sectional view illustrating a continuously variable traction roller transmission unit.

Referring to FIG. 2, the input shaft 14 is rotatably supported on the casing 67 through a ball bearing 65 and a needle bearing 66. Between the input shaft 14 and the ball bearing 66 is provided a spacer 68, whereas between the input shaft 14 and a loading nut 69 meshed therewith is provided a belleville spring 70. The reaction of the belleville spring 70 biases the input shaft 14 to the right as viewed in FIG. 2. A pin 71 from the loading nut 69 falls into a groove 14a of the input shaft 14 to tighten the loading nut 56. For receiving the pin 71, the loading nut 69 is formed with a plurality of bores 69a, and also the input shaft 14 is formed with a plurality of grooves 14a. By receiving the pin 71 into any mated pair of the bore 69a and the grooves 14a, a position of the loading nut 69 relative to the input shaft 14 can minutely be adjusted. The pin 71 is locked by a bolt 72 to prevent disconnection. The output traction disc 20 is rotatably supported on the input shaft 14 through a bearing 73. By means of a pair of keys 74 which are symmetrically positioned, the output gear 26 is secured to the output traction disc 20 for unitary rotation. Additionally, the input traction disc 18 is rotatably and axially slidably supported on the input shaft 14. A cam flange 77 is arranged on the back of the input traction disc 18, viz., on the opposite side of the output disc 20, and splined to the input shaft 14. A shoulder 78 of the input shaft 14 inhibits the cam flange 77 from sliding to the left as viewed in FIG. 2. A cam roller 79 is arranged between two opposite cam faces 18a, 77a of the input traction disc 18 and the cam flange 77. The cam roller 79 and the cam faces 18a, 77a are shaped in a manner such that relative rotation between the cam flange 77 and the input traction disc 18 causes a force to press the input disc 18 to the right as viewed in FIG. 2. Rotatably supported on the shaft 80 through a bearing 81 is the traction roller 22 which is disposed in a toroid groove formed by two opposite faces of the input and output traction discs 18, 20. Additionally, the traction roller 22 is supported in a thrust direction by a ball bearing 82 which is in turn supported by a roller support member 83. To prevent disconnection, the traction roller 22, the ball bearing 82, and the roller support member 83 are locked by two snap rings 84, 85 which are arranged to the shaft 80 at both ends thereof. Inserted in a bore of the input shaft 14 is a sleeve 86 which is locked by a snap ring 97 to prevent disconnection. The sleeve 86, except both end portions thereof to which an O-ring is arranged respectively, has the diameter smaller than the inner diameter of the input shaft 14, and a hydraulic passage 88 is defined by a clearance between the two. The input shaft 14 is formed with four radial bores 94, 93, 92, 91 to allow fluid communication with the hydraulic passage 88, and also with a groove 101 and a bore 102 to receive hydraulic fluid out of a hole 90 of the casing 67. The groove 101 is sealed by a seal ring 103. An oil pump drive shaft 87 is inserted in a bore of the sleeve 86, and a hydraulic passage 89 for lock-up control of the torque converter 12 is defined by a clearance between the two.

Figure 3:
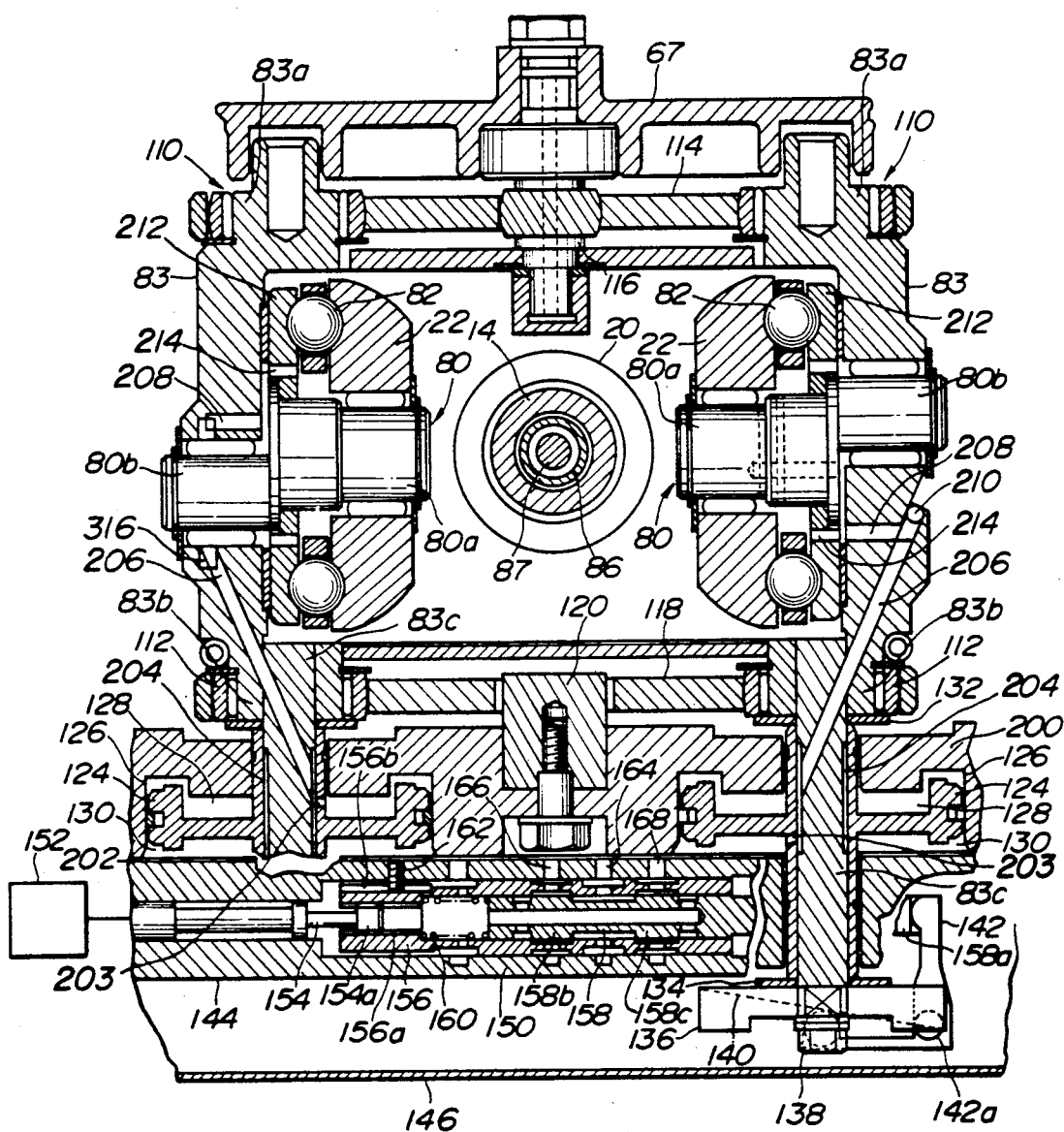
FIG. 3 is a longitudinal sectional view taken along the line III—III of FIG. 2.

Referring to FIG. 3, the right half as viewed in FIG. 3 is substantially the same as the left half as viewed in FIG. 3, so that a description will principally be made with regard to the right half. The roller support member 83 is rotatably and vertically slidably supported at the upper and lower rotation shafts thereof 83a, 83b by two spherical bearings 110, 112. The spherical bearing 110 is supported by a bearing support member 114 which is in turn supported by a link post 116 secured to the casing 67. Similarly, the spherical bearing 112 is supported by a bearing support member 118 which is in turn supported by a link post 120 secured to an upper control valve body 200. The valve body 200 is mounted to the casing 67. The roller support member 83 has an extension shaft 83c which is concentric with the rotation shaft 83b. It is to be noted that the extension shaft 83c is not formed with the rotation shaft 83b, but is a member secured thereto. A piston 124 is arranged on the periphery of the extension shaft 83c, and inserted in a cylinder 126 which is formed inside the upper control valve body 200. A hydraulic chamber 128 is formed over the piston 124, whereas a hydraulic chamber 130 is formed under the piston 124. Via a hydraulic passage defined by a bore 203 of the piston 124, a clearance 204 between the piston 124 and the extension shaft 83c, and two bores 206, 208 of the roller support member 83, the hydraulic chamber 130 is in fluid communication with an opening of the bore 208. It is to be noted that an opening of the bore 206 is stopped by a ball 210. A race 212 of the bearing 82 is formed with a bore 214. The left roller support member 83 includes substantially the same hydraulic passage defined by the piston bore 203, the clearance 204, and the two bores 206, 208. Here, it is to be noted that the bore 303 is in fluid communication with the upper hydraulic chamber 128, and that the bores 206, 208 are fluidly communicated with each other via an annular groove 316. The right and left pistons 124 are the same in shape, but have the bores 203 which are positioned differently to each other. Through a spacer 134, the piston 124 is in contact at the lower end thereof with a cam 136 which is secured, for unitary rotation, to the extension shaft 83c by a bolt 138. It is to be noted that the left extension shaft 83c is not provided with the cam 136. For the shaft 80, a portion 80a to support the traction roller 22 is eccentric with a portion 80b to be supported by the roller support member 83. The cam 136 includes an inclined surface 140 with which a link 142 is contact, so that rotation of the cam 136 causes the link 142 to swing. A lower control valve body 144 is secured to the upper control valve body 200 at the bottom thereof through a separate plate 202. For receiving the lower control valve body 144 and the cam 136, an oil pan 146 is attached to the casing 67. Secured to the lower control valve body 144 is a shift control valve 150 which includes a drive rod 154 which is rotated by a shift motor 152, a sleeve 156, a spool 158 which is inserted in a bore of the sleeve 156, and a spring 160 which presses the spool 158 to the right as viewed in FIG. 3. The drive rod 154 has at the leading end thereof an externally threaded head portion 154a which is engaged with an internally threaded bore 156a of the sleeve 156. The sleeve 156 has an axial groove 156b in which is received a pin 162 secured to the lower control valve body 144. This allows the sleeve 156 to be axially slidable without rotation. A force of the spring 160 presses a right end 158a of the spool 158 to the link 142. The spool 158 includes two lands 158a, 158b by which an opening degree of a port fluidly communicating with hydraulic passages 166, 168 is adjustable. When the reduction ratio is constant, the spool 158 is always located at a predetermined position in the sleeve 156 as shown in FIG. 3, and it operates to supply the hydraulic fluid having the same level of pressure to the hydraulic passages 166, 168. On the other hand, during shifting, the spool 158 is located at a position other than the predetermined position, and it operates to distribute the hydraulic fluid out of the passage 164 to the passages 166, 168 in accordance with that position. The hydraulic passage 168 is connected to the right and left hydraulic chambers 128, 130, whereas the hydraulic passage 166 is connected to the right and left hydraulic chambers 130, 128.

Figure 4:
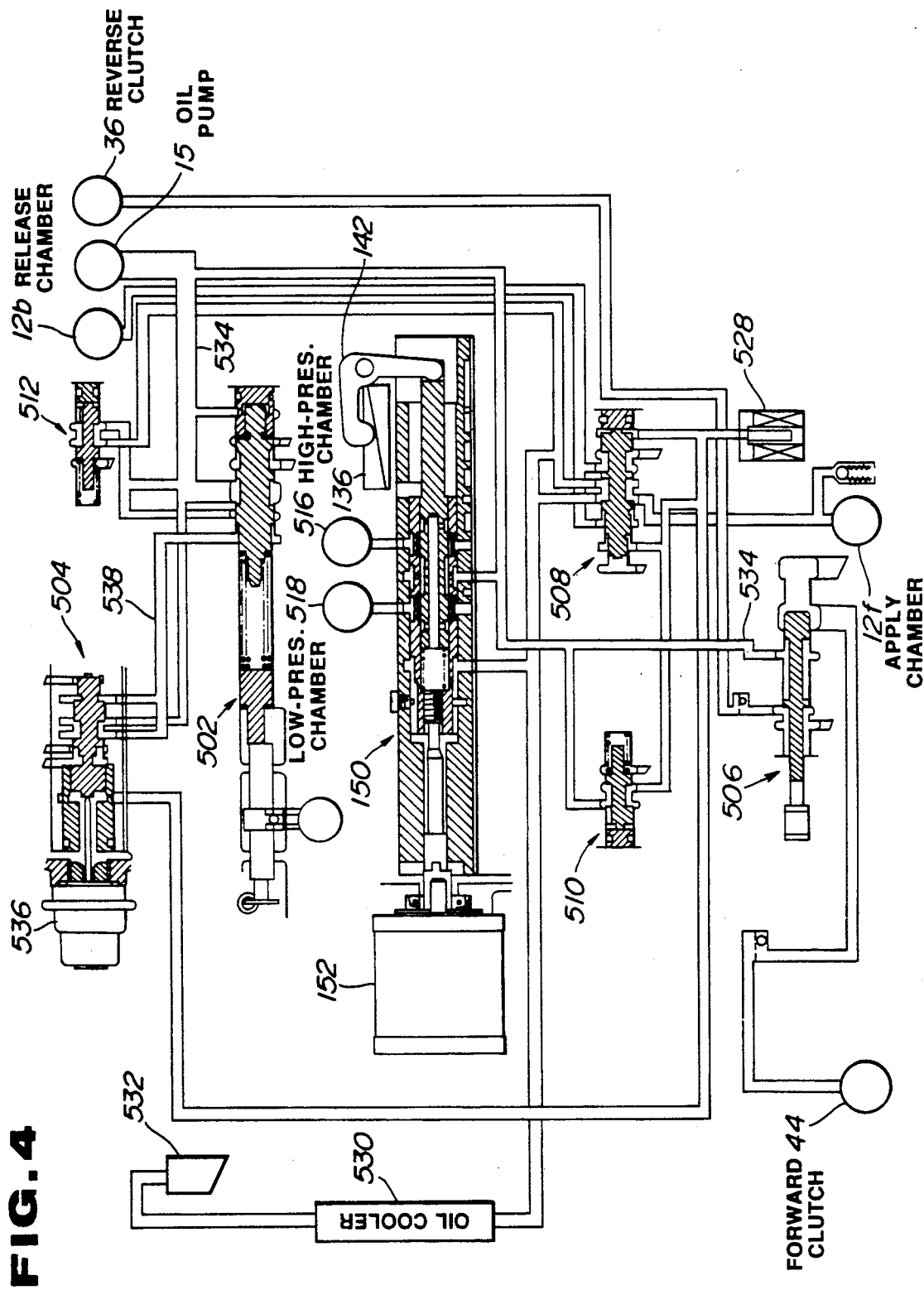
FIG. 4 is a schematic diagram illustrating a hydraulic circuit for the continuously variable traction roller transmission.

Referring to FIG. 4, a hydraulic control circuit includes the shift control valve 150, a line pressure regulator valve 502, a throttle valve 504, a manual valve 506, a lock-up control valve 508, two constant pressure regulator valves 510, 512. These valves are connected to each other as shown in FIG. 4. The circuit also includes an oil pump 15, a high-pressure chamber 516 (the right and left hydraulic chambers 130, 128 in FIG. 3), a low-pressure chamber 518 (the right and left hydraulic chambers 128, 130 in FIG. 3), a forward clutch 44, a reverse clutch 36, an apply chamber 12f of the torque converter 12, a release chamber 12b of the torque converter 12, a solenoid 528, an oil cooler 530, and a lubrication circuit 532, which are connected to each other as shown in FIG. 4. The line pressure regulator valve 502 adjusts a level of hydraulic pressure of the hydraulic passage 534 (line pressure) to which a delivery pressure of the oil pump 15 is supplied. The throttle valve 504 produces a hydraulic pressure (throttle pressure) in response to a force of a vacuum diaphragm 536, and supplies it to a hydraulic passage 538. The shift control valve 150 controls, as described hereinbefore, the distribution of hydraulic pressure between the high-pressure and low-pressure chambers 516, 518 by operation of the shift motor 152, and thus achieves a predetermined reduction ratio. For carrying out a shifting between forward and reverse drives of the motor vehicle, the manual valve 506 supplies the line pressure out of the hydraulic passage 534 to the forward clutch 44 or the reverse clutch 36 in accordance with the position of a select lever. In response to a hydraulic pressure produced by the solenoid 528 which is controlled in duty ratio, the lock-up control valve 508 controls a distribution and a level of hydraulic pressure for the apply and release chambers 12f, 12b for engagement and release of the lock-up clutch 12a. The constant pressure regulator valve 510 adjusts a level of constant pressure for the solenoid 528, whereas the constant pressure regulator valve 512 adjusts a hydraulic pressure to the torque converter 12 within a predetermined level.

Figure 5:
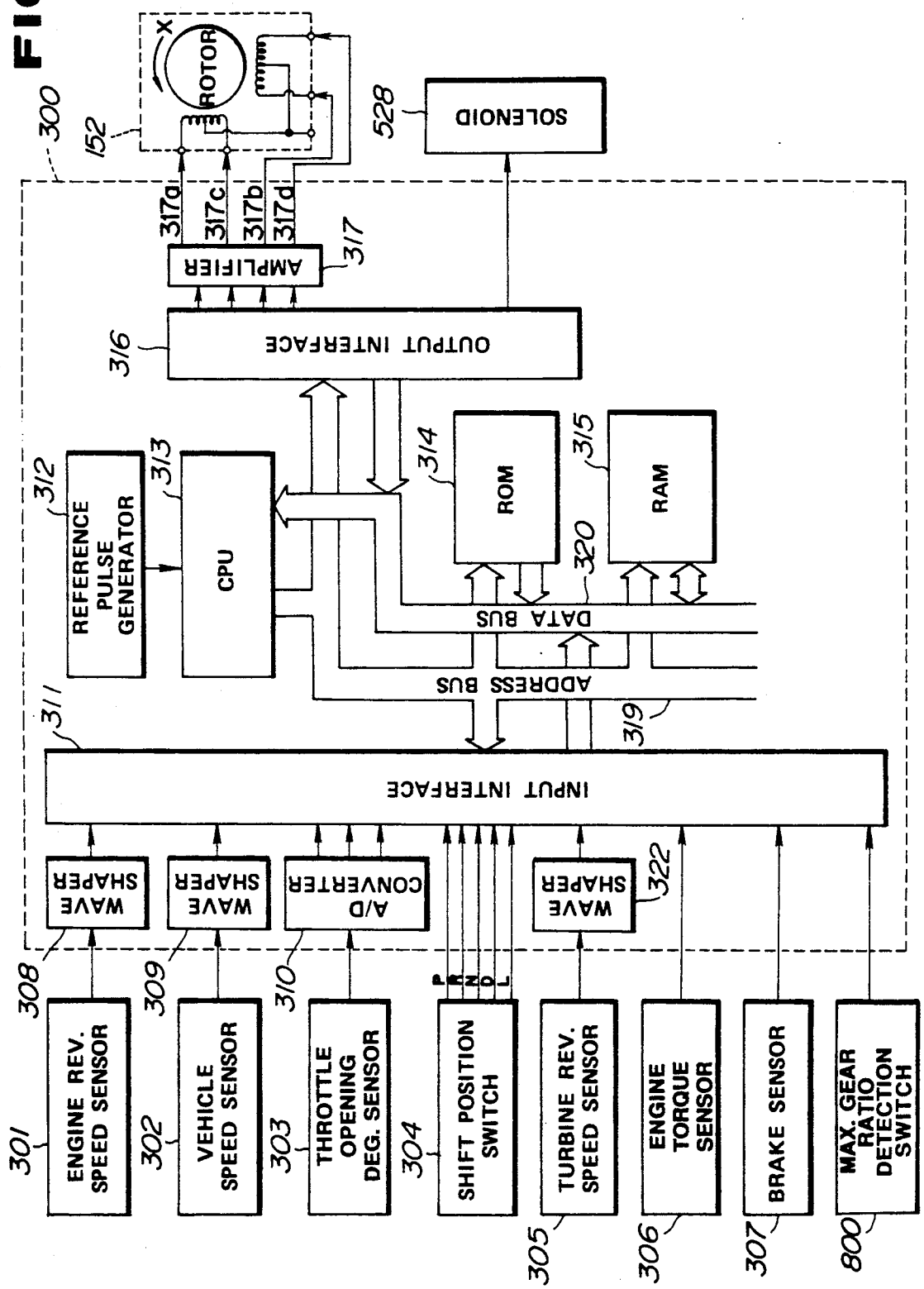
FIG. 5 is a block diagram showing an electrical connection of a control unit.

Referring to FIG. 5, a control unit 300 which controls operation of the shift motor 152 and the solenoid 528 includes an input interface 311, a reference pulse generator 312, a central processing unit (CPU) 313, a read-only memory (ROM) 314, a random-access memory (RAM) 315, and an output interface 316 which are connected to each other by an address bus 319 and a data bus 320. Inputted to the control unit 300 directly or via three wave shapers 308, 309, 322, and an analog-to-digital (A/D) converter 310 are signals from an engine revolution speed sensor 301, a vehicle speed sensor 302, a throttle opening degree sensor 303, a shift position switch 304, a turbine revolution speed sensor 305, an engine torque sensor 306, a brake sensor 307, and a maximum reduction ratio detection switch 800. On the other hand, outputted from the control unit 300 via an amplifier 317 and four lines 317a to 317d are signals to the shift motor 152 and the solenoid 528.

Referring to FIGS. 6 to 9, the content of control carried out by the control unit 300 will be described.

Figure 6:
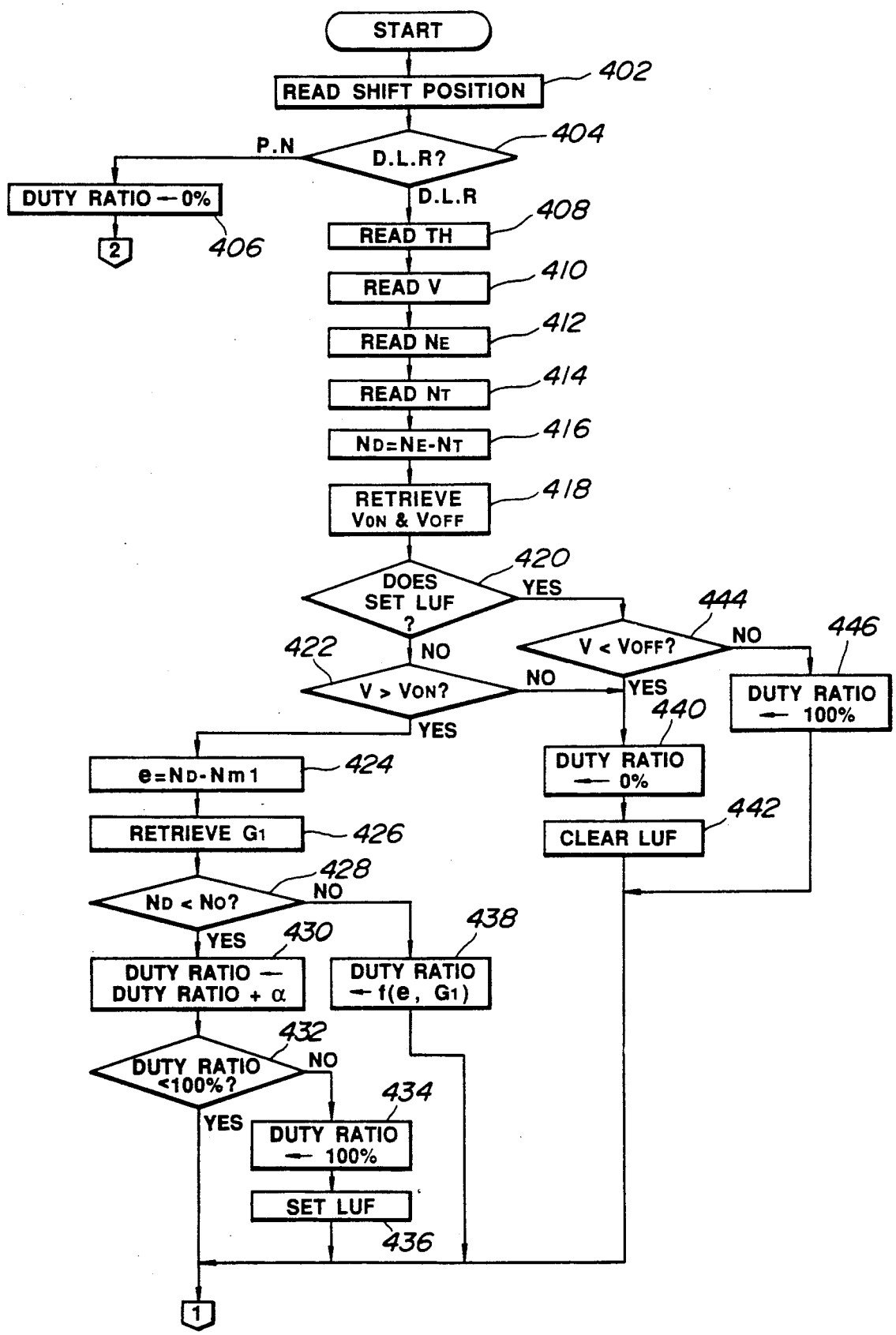
FIGS. 6 to 9 are flowcharts showing a control program.

Referring to FIG. 6, there is shown a program for complete engagement and lock-up controls preformed by the solenoid 528. This program is disclosed, for example, in U.S. Pat. No. 4,735,113 which is herein incorporated for reference.

Figure 7:
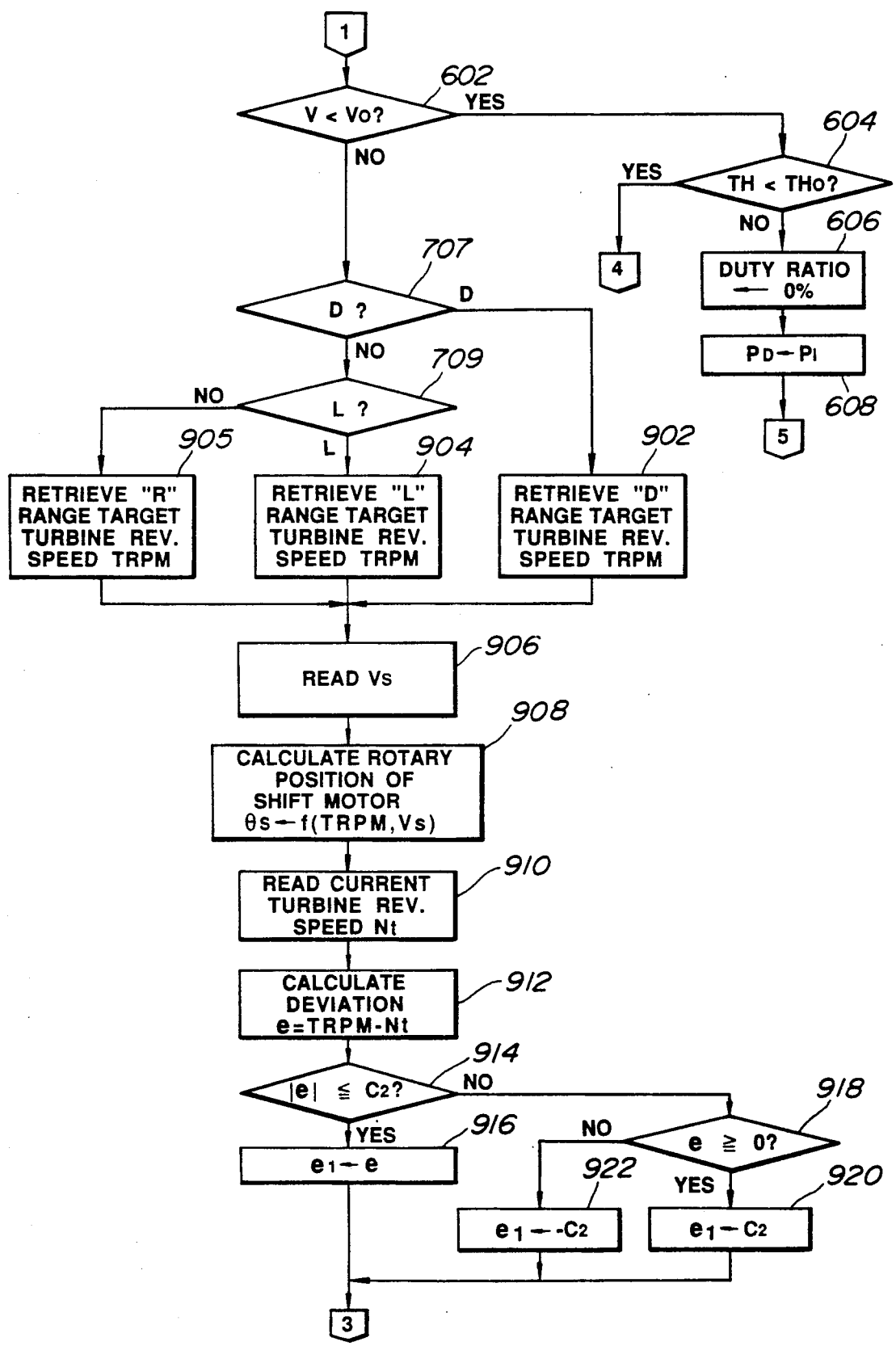

Referring to FIG. 7, at a step 602, it is determined whether a vehicle speed V is less than a predetermined value $V_O$ or not. This predetermined value $V_O$ is set equal to 2 to 3 km/h, for example. If $V<V_O$, a creep control is carried out as follows: At a subsequent step 604, it is determined whether a throttle opening degree TH is less than a predetermined value $TH_O$ or not. If $TH \geq TH_O$, viz., the throttle valve 504 does not fall in an idle condition, the control proceeds to a step 606 where the duty ratio is set to 0%. By this operation, the forward clutch 44 is completely engaged. At a subsequent step 608, a target pulse number $P_D$ of the shift motor 152 is set to $P_1$. Then, the control proceeds from the step 608 to a step 630 as shown in FIG. 9.

Figure 9:
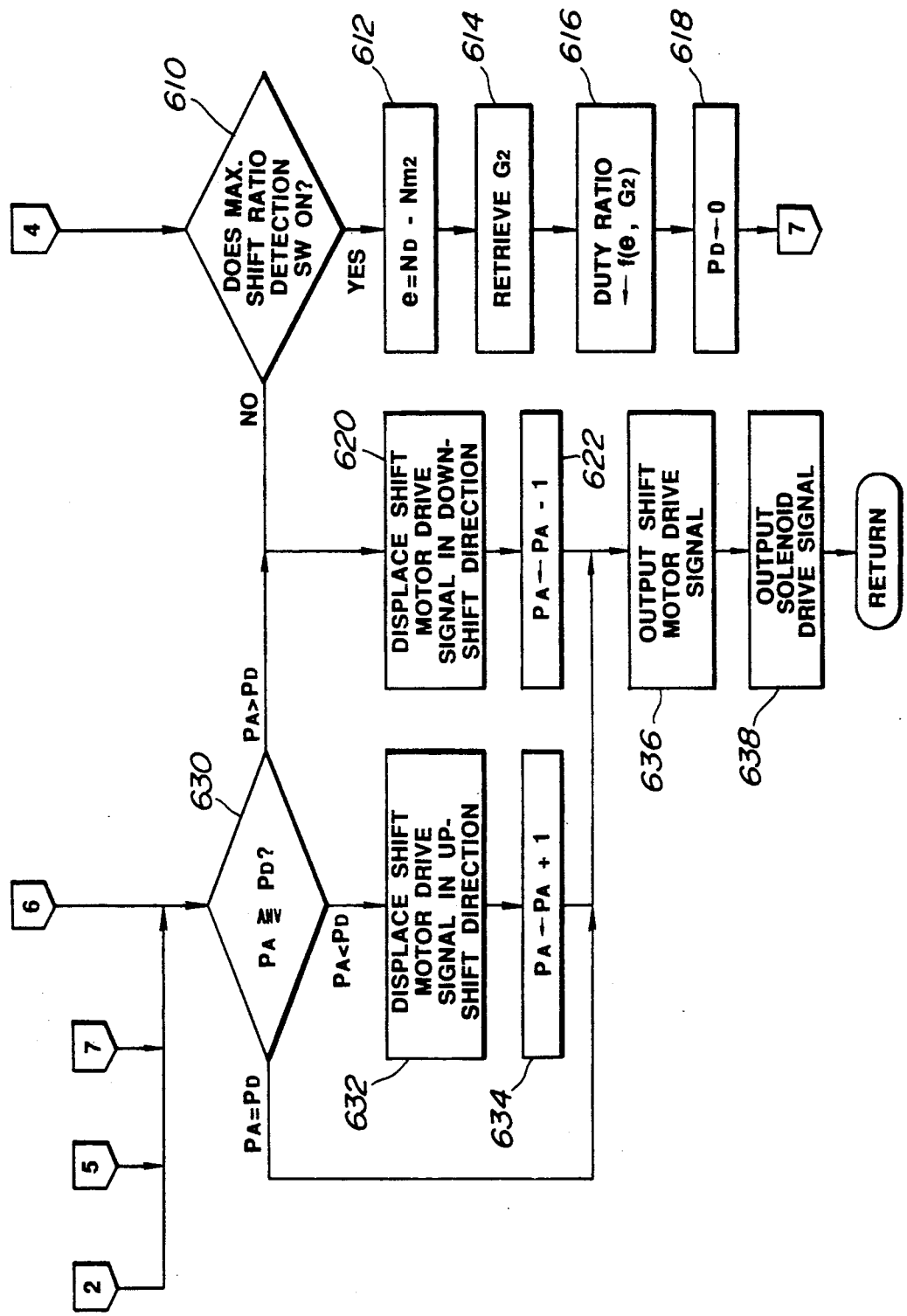

At the step 604, if $TH<TH_O$, viz., the throttle valve 504 is in the idle condition, the control goes to a step 610, as shown in FIG. 9, where it is determined whether the maximum reduction ratio detection switch 800 is ON OR not. If the detection switch 800 is ON, the control goes to a step 612 where a deviation is obtained by subtracting a target deviation $N_{m2}$ by a difference $N_D$ between an engine revolution speed $N_E$ and a turbine revolution speed $N_T$, and set as e. At a subsequent step 614, a feed-back gain $G_2$ is retrieved based on the deviation e. The duty ratio is set, at a step 616, in response to the deviation e and the feed-back gain $G_2$. Subsequently, at a step 618, the target pulse number $P_D$ of the shift motor 152 is set to 0 (zero), then the control proceeds from the step 618 to the step 630.

Figure 8:
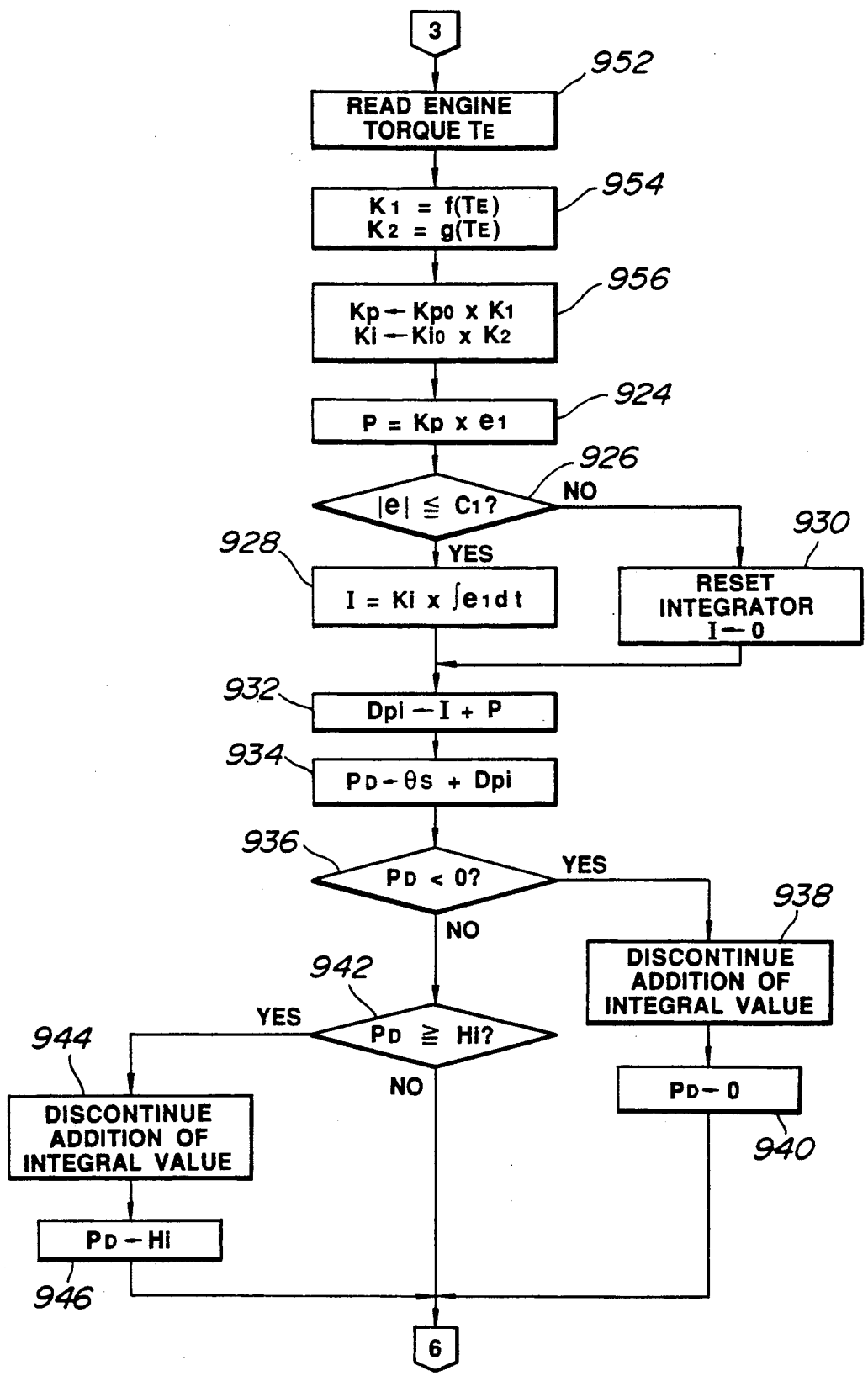

Referring again to FIG. 7, at the step 602, if $V \geq V_O$, a shift control is carried out as follows: At a subsequent step 707, it is determined whether a current drive position is in "D" range or not. If the answer to the inquiry at the step 707 is YES, the control proceeds to a step 902 where a "D" range target turbine revolution speed TRPM is determined by retrieval of a "D" range target turbine revolution speed table. On the other hand, if the answer to the inquiry at the step 707 is NO, the control goes to a step 709 where it is determined whether the current drive position is in "L" range or not. When the current drive position is in "L" range, the control proceeds from the step 709 to a step 904 where the "L" range target turbine revolution speed TRPM is determined by retrieval of a "L" range target turbine revolution speed table. On the other hand, when the current drive position is not in "L" range, the control goes to a step 905 where the "R" range target turbine revolution speed TRPM is determined by retrieval of a "R" range target turbine revolution speed table. Subsequently to the determination of the target turbine revolution speed TRPM by retrieval of the target turbine revolution speed table at the step 902 or 904 or 905, the control proceeds to a step 906 where the vehicle speed $V_S$ is read in the RAM. At a subsequent step 908, a current rotary position $\theta s$ (theta s) of the shift motor 152 is calculated based on the target turbine revolution speed TRPM and the vehicle speed $V_S$. This current rotary position $\theta s$ (theta s) indicates an amount of feed-forward control. Then, a current turbine revolution speed $N_T$ is read in the RAM at a step 910, and the deviation e between the target turbine revolution speed TRPM and the current revolution speed $N_T$ is calculated at a step 912. At a subsequent step 914, it is determined whether an absolute value of the deviation e is less than or equal to a second predetermined value $C_2$ or not. This second predetermined value $C_2$ is set equal to 300 rpm, for example. If $|e|<C_2$, the control proceeds to a step 916 where the deviation e is set to $e_1$, and it goes from the step 916 to a step 952 as shown in FIG. 8. On the other hand, at the step 914, if $|e| \geq C_2$, the control proceeds to a step 918 where it is determined whether the deviation e is more than or equal to 0 (zero) or not. If $e>0$, the control goes to a step 920 where $C_2$ is set to $e_1$. On the other hand, if $e<0$, the control goes to a step 922 where $-C_2$ is set to $e_1$. Subsequently to the step 920 or 922, the control proceeds to the step 952 as shown in FIG. 8.

Figure 10:
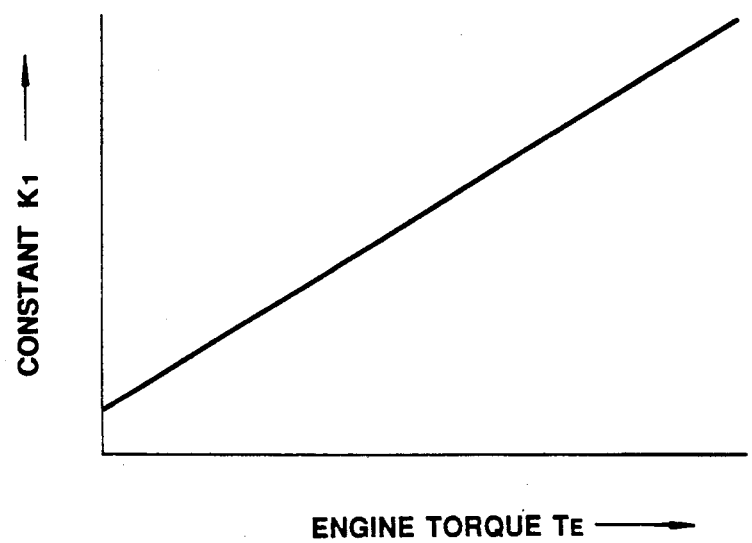
FIG. 10 is a graphical representation showing a relationship between a constant $K_1$ and an engine torque $T_E$.
Figure 11:
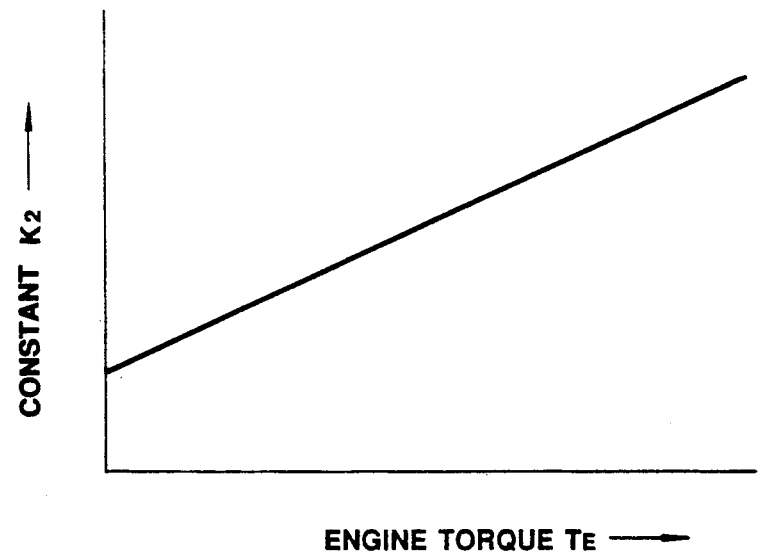
FIG. 11 is a view similar to FIG. 10, but showing a relationship between a constant $K_2$ and the engine torque $T_E$.

Referring to FIG. 8, at the step 952, a current engine torque $T_E$ is read in the RAM. At a step 954, two constants $K_1$, $K_2$ are set in proportion to $T_E$. It is to be noted that values of $K_1$, $K_2$ are larger than 1, respectively, and set to be increased in proportion to $T_E$ as shown in FIGS. 10, 11. At a step 956, two products are obtained by multiplying two predetermined values $K_{po}$, $K_{io}$ by the constants $K_1$, $K_2$, respectively, and set as $K_p$, $K_i$. At a subsequent step 924, a product of $e_1$ and $K_p$ is set as P. This product P indicates a proportional term of an amount of feed-back control which is variable in proportion to the deviation e. Subsequently, at a step 926, it is determined whether the absolute value of the deviation e is less than or equal to a first predetermined value $C_1$ or not. This first predetermined value $C_1$ is set equal to 500 rpm, for example. If $|e| \leq C_1$, the control proceeds to a step 928 where an integral term is obtained by multiplying an integral of $e_1$ by the constant $K_i$, and set as I. On the other hand, if $|e|>C_1$, the control proceeds to a step 930 where I is set to 0 (zero). That is, an integrator is reset to zero. Subsequently to the step 928 or 930, the control goes to a step 932 where a sum of I and P is set as $D_{pi}$. This sum $D_{pi}$ indicates the amount of feed-back control. A sum of $\theta s$ (theta s) (the rotary position) and $D_{pi}$ is set, at a step 934, as the target pulse number $P_D$. At a subsequent step 936, it is determined whether the target pulse number $P_D$ is less than 0 (zero) or not. Zero pulse number corresponds to the maximum reduction ratio which can be established in the continuously variable transmission. If $P_D>0$, the control proceeds to a step 938 where addition of the integral value is discontinued. Subsequently, at a step 940, the target pulse number $P_D$ is set to 0 (zero), then the control goes to the step 630 as shown in FIG. 9. On the other hand, at the step 936, if $P_D \geq 0$, the control proceeds to a step 942 where it is determined whether $P_D$ is more than or equal to a predetermined value $H_i$. This predetermined value $H_i$ is a pulse number corresponding to a minimum reduction ratio which can be established in the continuously variable transmission. If the $P_D<H_i$, the control proceeds from the step 942 to the step 930 as shown in FIG. 9. If $P_D>H_i$, the control proceeds to a step 944 where addition of the integral value is discontinued. Subsequently, the control goes to a step 946 where the target pulse number $P_D$ is set to the predetermined value $H_i$, then it goes to the step 630.

At the step 630, a comparison is made between the target pulse number $P_D$ and the current pulse number $P_A$. If $P_D = P_A$, the shift motor drive signal is outputted at a step 636, and the solenoid drive signal is outputted at a step 638, then the control is returned to START. If $P_A<P_D$, the shift motor drive signal is displaced, at a step 632, in an upshift direction. At a subsequent step 634, a sum of the current pulse number P and 1 is set as the new pulse number $P_A$, then the control proceeds to the step 636. If $P_A>P_D$, the shift motor drive signal is displaced, at a step 620, in a down-shift direction. At a subsequent step 622, a difference between the current pulse number $P_A$ and 1 is set as the new pulse number $P_A$, then the control proceeds to the step 636.

In brief, the following control is carried out according to the above-mentioned routine. First, at the step 908, the amount of feed-forward control is calculated. At the step 924, the proportional term P of the amount of feed-back control is calculated, then, at the step 928, the integral term I of the feed-back control is calculated. Subsequently, at the step 632, the amount of feed-back control $D_{pi}$ is given by the sum of the integral term I and the porportional term P. In this event, feed-back gains are $k_1$ times and $K_2$ times the reference values ($K_{po}$, $K_{io}$), respectively. As described hereinbefore, the values of $K_1$, $K_2$ become greater as the engine torque $T_E$ increases. Thus, the larger is the engine torque $T_E$, the higher are the responsibility and the followability of the shift control. Accordingly, even if the engine torque $T_E$ is large, quick responsibility of shifting can be achieved. Further, during normal operation of the motor vehicle, the current reduction ratio is inhibited from exceeding the target reduction ratio.

Having described the embodiment wherein the present invention is applied to the continuously variable traction roller transmission, it is to be noted that the present invention is also applicable to a continuously variable V-belt transmission.

What is claimed is:

1. An apparatus comprising:
    a continuously variable transmission having at least one pair of traction rollers; and
    a system for controlling said continuously variable transmission such that the continuously variable transmission is adjusted to a reduction ratio that is determined in response to a position at which a shift actuator is positioned, the system comprising
    means for determining a target value of a predetermined variable related to a reduction ratio which the continuously variable transmission should be adjusted to and for generating a target value indicative signal indicative of said target value determined;
    means for detecting a current value of said predetermined variable and for generating a current value indicative signal indicative of said current value detected;
    means for detecting a current torque which the continuously variable transmission is subject to and for generating a current torque indicative signal indicative of said current torque detected;
    means for controlling the shift actuator in a feed-back control manner with a feed-back gain such that a deviation between said current value indicative signal and said target value indicative signal reduces toward zero;
    means for altering said feed-back gain in response to said current torque indicative signal; and
    shift control valve means for controlling a distribution of hydraulic pressure related to said reduction ratio in response to the position at which the shift actuator is positioned.

2. A method of controlling a continuously variable transmission such that the continuously variable transmission is adjusted to a reduction ratio that is determined in response to a position at which a shift actuator is positioned, the continuously variable transmission having at least one pair of traction rollers, the method comprising the steps of:
    determining a target value of a predetermined variable related to a reduction ratio which the continuously variable transmission should be adjusted to and generating a target value indicative signal indicative of said target value determined;
    detecting a current value of said predetermined variable and generating a current value indicative signal indicative of said current value detected;
    detecting a current torque which the continuously variable transmission is subject to and generating a current torque indicative signal indicative of said current torque detected;
    controlling the shift actuator in a feed-back control manner with a feed-back gain such that a deviation between said current value indicative signal and said target value indicative signal reduces toward zero;
    altering said feed-back gain in response to said current torque indicative signal; and
    controlling a distribution of hydraulic pressure related to said reduction ratio in response to the position at which the shift actuator is positioned.

3. The apparatus of claim 1, wherein said means for altering said feed-back gain includes
    means for setting first and second constants in proportion to said current torque detected, and
    means, responsive to said means for setting, for altering proportional and integral components of said feed-back gain using said first and second constants, respectively.

4. The apparatus of claim 2, wherein said step of altering said feed-back gain includes
    setting first and second constants in proportion to said current torque detected, and
    altering proportional and integral components of said feed-back gain using said first and second constants, respectively.

* * * * *